W. H. GUTHRIE.
AUTOMATIC AIR CONTROLLING DEVICE FOR GAS ENGINES.
APPLICATION FILED JAN. 11, 1917.
1,253,963.
Patented Jan. 15, 1918.
2 SHEETS—SHEET 1.
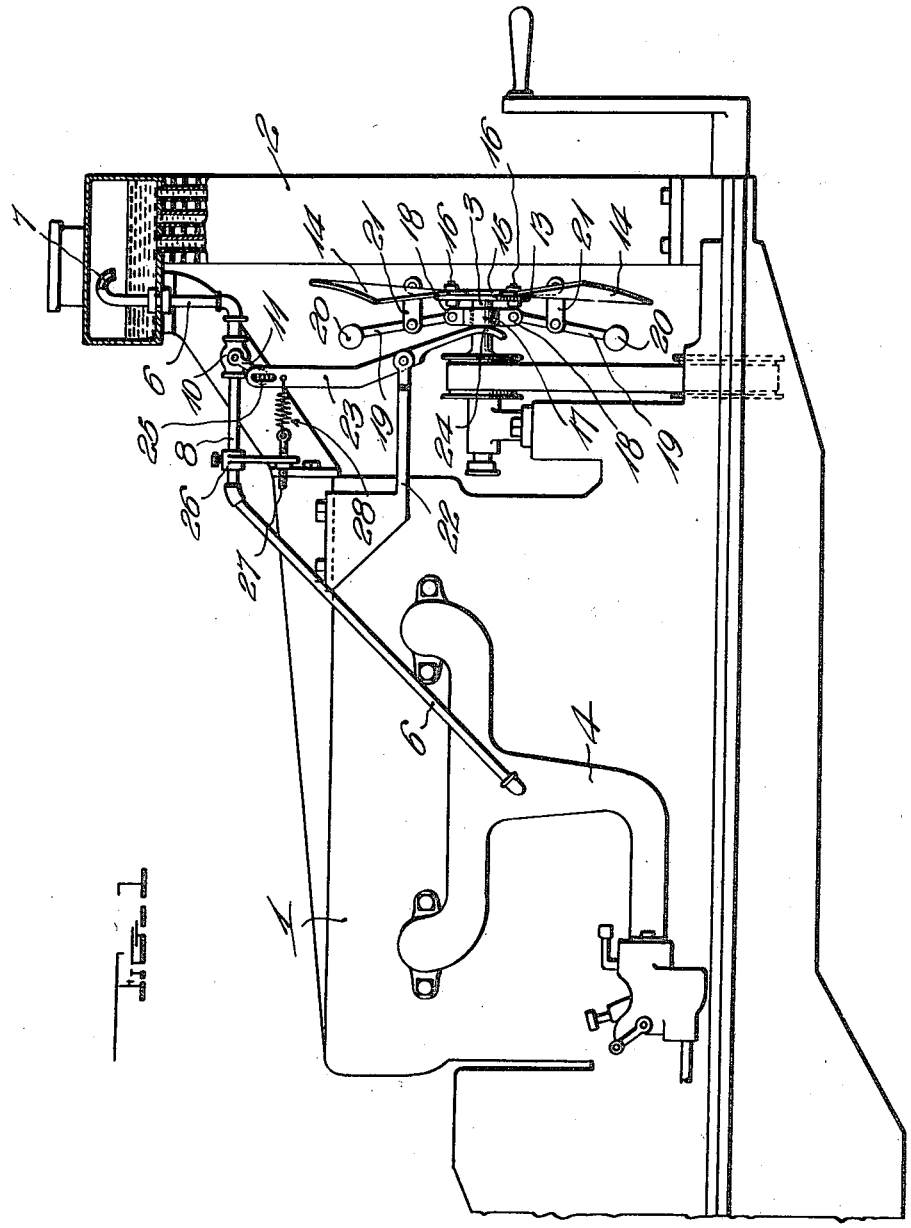
Witness
Inventor
Wade H. Guthrie
By H. B. Willson & Co.
Attorneys

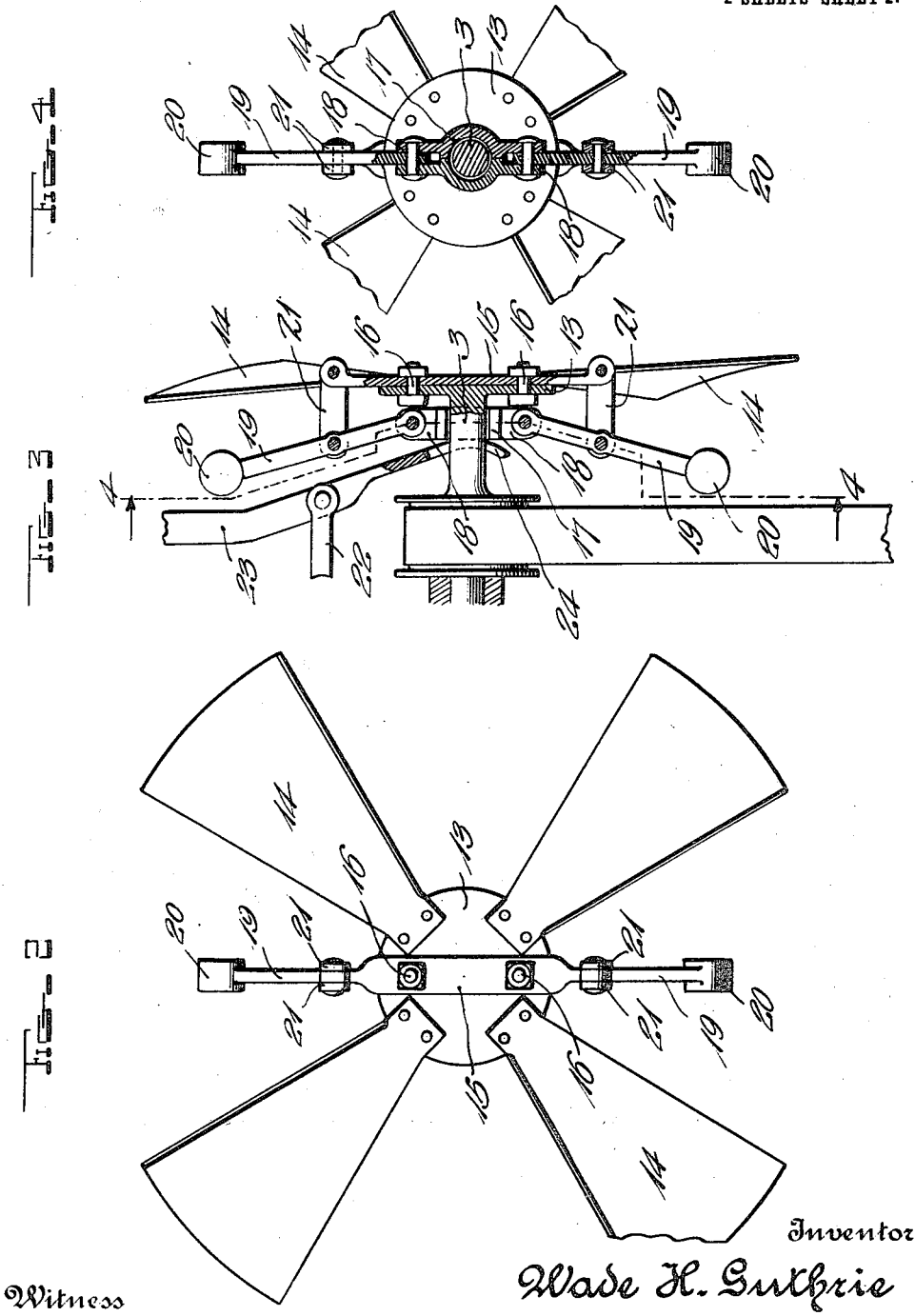

UNITED STATES PATENT OFFICE.

WADE H. GUTHRIE, OF CHARLESTON, WEST VIRGINIA.

AUTOMATIC AIR-CONTROLLING DEVICE FOR GAS-ENGINES.

1,253,963.     Specification of Letters Patent.     Patented Jan. 15, 1918.

Application filed January 11, 1917. Serial No. 141,881.

*To all whom it may concern:*

Be it known that I, WADE H. GUTHRIE, a citizen of the United States, residing at Charleston, in the county of Kanawha and State of West Virginia, have invented certain new and useful Improvements in Automatic Air-Controlling Devices for Gas-Engines; and I do declare the following to be a full, clear, and exact description of the invention, such as will enable others skilled in the art to which it appertains to make and use the same.

This invention relates to new and useful improvements in automatic air controlling devices for gasolene or explosive engines and more particularly to one in which the speed of an engine automatically controls the opening and closing of a valve arranged in a pipe to admit air or steam from the top of an automobile radiator or any other point to the intake manifold of the engine, thereby increasing the power and decreasing the expense of operating a motor.

Another object of this invention is to provide a device of this character which is simple and durable in construction, inexpensive to manufacture, and one which will be very efficient in operation.

With these and numerous other objects in view, my invention consists of the novel features of construction, combination and arrangement of parts which will be hereinafter referred to and more particularly pointed out in the specification and claim.
In the accompanying drawings:

Figure 1 is a side elevation partly in section of an automobile engine, showing the invention applied thereto;

Fig. 2 is an end elevation of the fan shaft showing the manner of attaching the governor;

Fig. 3 is a detail side elevation, partly in section, showing the end of the fan shaft with the governor and the lower end of the operating lever in position;

Fig. 4 is a vertical section on the line 4—4 of Fig. 3.

In the accompanying drawings, 1 denotes the automobile engine, 2 the radiator, 3 the usual cooling fan shaft which is driven by a belt or other means from the engine shaft, and 4 denotes the intake manifold of the engine.

In applying my invention to an automobile engine I provide a suitable auxiliary inlet pipe 6 that extends into the upper portion of the automobile radiator 2 having a downwardly turned end 7 thereon to receive steam from the radiator. It will be understood, however, that this pipe may lead to another source of steam supply or take in air heated or otherwise. The pipe 6 extends downwardly and is connected at its inner end with the intake manifold 4 of the engine. The pipe 6 is provided intermediate its ends with a horizontally extending portion 8 and disposed in this portion is a valve 10 having an operating arm or lever 11 projecting therefrom. This valve controls the auxiliary inlet pipe 6, by operation of the lever 11.

In order to automatically operate the valve 10 according to the speed of the engine, I have provided on the fan driving shaft 3 a centrifugally operated governing device which is connected with the operating lever of the valve so as to automatically operate the same as will be hereinafter more fully described. The outer end of the fan shaft 3 is provided with an enlarged hub portion 13, from which the fan blades 14 radiate and are secured thereto in spaced relation. Projecting across this enlarged portion 13 of the shaft is a strip 15 that is secured thereto and has its opposite ends extending from the hub between the blades of the fan as shown at 16. A collar 17 is slidably mounted on the shaft 3 and the opposite side of the hub portion to which the strip 15 is secured and this collar is provided with laterally projecting portions 18 which have pivotally connected therewith at one end governor arms 19. These governor arms 19 have centrifugally operating weights 20 positioned on their outer ends and the arms are connected with the projecting ends 16 of the strip 15 by means of links 21 which also form fulcrum points upon which the governor arms are pivoted. It is obvious that upon the fan shaft being driven at a certain speed the governor will operate and the arms will move outwardly, hence moving the movable collar 17 longitudinally on the shaft 3.

Secured to the engine body 1 is a bracket 22 which has pivoted to its outer end an operating lever 23. This lever 23 has its lower end forked as shown at 24 and adapted to straddle the fan shaft 3 adjacent the movable collar 17. The upper end of the lever 23 is operatively connected with the lever 11 which operates the valve 10 preferably by having a stud on said lever positioned through a longitudinally extending slot 25 in said upper end of the same. By this construction upon rearward movement of the movable collar 17 due to the operation of the centrifugal governor the lever 23 will be operated and hence the movement transmitted to the valve 10 to open the same.

The horizontal portion of the pipe 6 is provided with an adjustable slide member 26 which has a screw 27 positioned through its lower end, and at right angles to the same. Connecting the outer end of the screw 27 and the outer end of the lever 23 is a coiled spring 28 which exerts a sufficient tension on the upper end of said lever to hold the lower end of the same against the face of the movable collar 17. This construction will hold the lower end of the operating lever always into engagement with the movable collar 17 and hence upon operation of the governor the lever 23 will be operated.

In operation when the speed of the engine reaches a predetermined point the weights 20 of the governor will fly upwardly and move the arms 19, whereupon the movable collar 17 will be moved rearwardly along the fan shaft. As the operating lever 23 is normally held in engagement with this collar, the slightest movement of the same will be transmitted to the valve 10 which is connected with the upper end of the lever, hence opening the valve and holding the same open while the governor is in operation. As the speed of the engine decreases the governor arms will return to their normal positions and hence the movable collar 17 will be moved back toward the hub portion of the fan shaft. The tension of the coiled spring 28 on the upper end of the lever 23 will cause the lower forked end of this lever to follow the collar and hence the valve 10 controlled by the operation of the lever will be again closed and cut off the flow of steam or air to the intake manifold from the radiator. It will thus be seen that the entire operation of this device is absolutely automatic, and furthermore, this device is so constructed that it is applied to the only exposed movable part of the modern automobile engine. The construction employed in this automatic device utilizes the small space on the fan shaft that is exposed and does not require any change in the castings or other parts of the engine to apply the same thereto. It is not necessary that the steam or heated air be taken from the top of the radiator, as the pipe 6 may be used for supplying steam or air from any other source.

From the foregoing description of the construction and operation of my improved invention, the manner of applying the same to use, and the operation thereof will be readily understood and it will be seen that I have provided a simple and efficient device of this character for carrying out the objects of the invention.

I claim:

An auxiliary air control for an explosive engine having a driven fan shaft and an auxiliary inlet pipe for the intake manifold, said shaft having an enlarged hub portion with fan blades radiating therefrom comprising a strip extending across said hub and secured to the same, the end of said strip projecting from the hub between the blades of the fan, a collar slidably mounted on said shaft, governor arms pivotally connected at one end to said collar, centrifugally acting weights on the outer ends of said arms, links connecting the ends of the strip and the arms and forming fulcrum points for said arms, a bracket on the engine body, a lever fulcrumed on said bracket with one end forked and adapted to straddle the fan shaft, a valve in said inlet pipe, operating means between the free end of said lever and the valve, and a spring for actuating said lever to hold the forked end of the latter against the movable collar.

In testimony whereof I have hereunto set my hand in the presence of two subscribing witnesses.

WADE H. GUTHRIE.

Witnesses:
HARRY MORGAN,
G. NEBBERGALL.